United States Patent [19]

Banks et al.

[11] 4,250,060

[45] Feb. 10, 1981

[54] GAS MAKING CALCINED CATALYST PRECURSORS OF NICKEL, ALUMINA, SODIUM AND POTASSIUM

[75] Inventors: Reginald G. S. Banks; Alan Williams, both of Solihull, England

[73] Assignee: British Gas Corporation, London, England

[21] Appl. No.: 49,601

[22] Filed: Jun. 18, 1979

Related U.S. Application Data

[60] Continuation of Ser. No. 930,815, Aug. 3, 1978, abandoned, which is a division of Ser. No. 704,410, Jul. 12, 1976, Pat. No. 4,105,591.

[30] Foreign Application Priority Data

Sep. 29, 1975 [GB] United Kingdom ............... 39724/75

[51] Int. Cl.$^3$ .......................... B01J 21/04; B01J 23/78
[52] U.S. Cl. .................................................. 252/466 J
[58] Field of Search .......... 252/466 J; 48/213, 214 A; 260/449 M, 449.6 M; 423/654

[56] References Cited

U.S. PATENT DOCUMENTS

| | | | |
|---|---|---|---|
| 3,320,182 | 5/1967 | Taylor et al. | 252/466 |
| 3,759,678 | 9/1973 | Chamberland et al. | 48/214 |
| 3,926,584 | 12/1975 | Adsetts | 252/466 J |
| 3,950,368 | 4/1976 | Broeker et al. | 252/466 J |
| 3,988,263 | 10/1976 | Hansford | 252/466 J |
| 4,005,996 | 2/1977 | Hausberger et al. | 260/449 M |
| 4,104,201 | 8/1978 | Banks et al. | 48/214 A |

FOREIGN PATENT DOCUMENTS

| | | |
|---|---|---|
| 1470700 | 1/1969 | Fed. Rep. of Germany . |
| 1438233 | 4/1966 | France . |
| 2206299 | 6/1974 | France . |
| 1055909 | 1/1967 | United Kingdom . |

*Primary Examiner*—P. E. Konopka

[57] ABSTRACT

A catalyst precursor which when reduced can produce a catalyst suitable for the high pressure gasification of heavy hydrocarbons to produce methane-containing gases comprises a calcined coprecipitated-alumina containing from 50–65% Ni precursor. The catalyst contains (1) from 0 to not more than 0.43% K and from 0 to not more than 0.1% Na, (2) the combined weights of Na+K does not exceed 0.011 gm atoms/100 gm of catalyst, precursor (3) the ratio of Na: K falls within the area defined by ABCDEO in FIG. 1 of the drawings and (3) at combined Na+K weights of from 0 to 0.05% the water loss is not more than 11.2%.

The catalyst precursors are prepared with the aid of a filtering aid selected from $(NH_4)_2\ CO_3$, $Na_2\ CO_3$, $K_2CO_3$, $Na\ NO_3$ or $K\ NO_3$ to obtain low levels of alkali. The final catalyst may be employed for steam reforming reactions to produce methane-containing gases.

5 Claims, 7 Drawing Figures

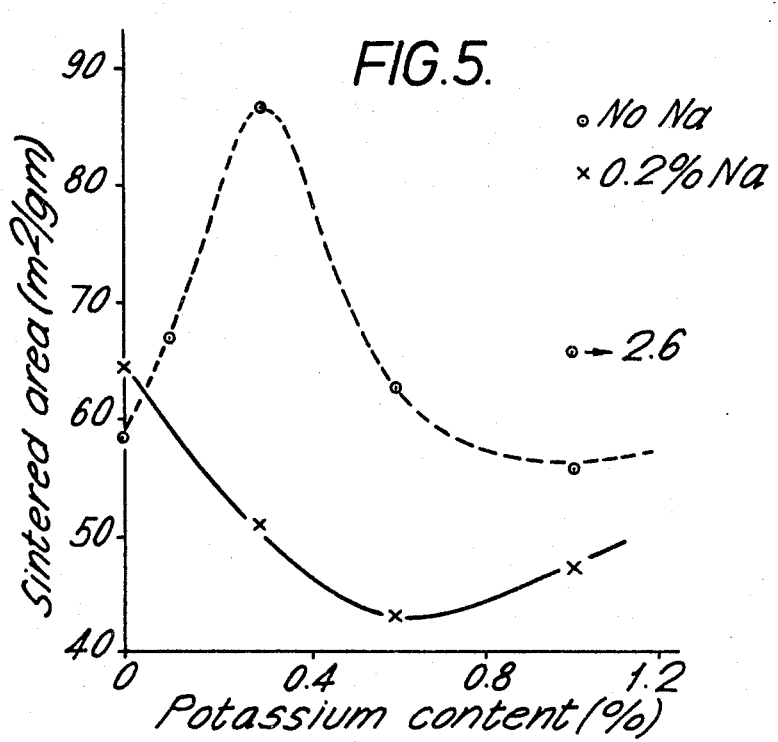
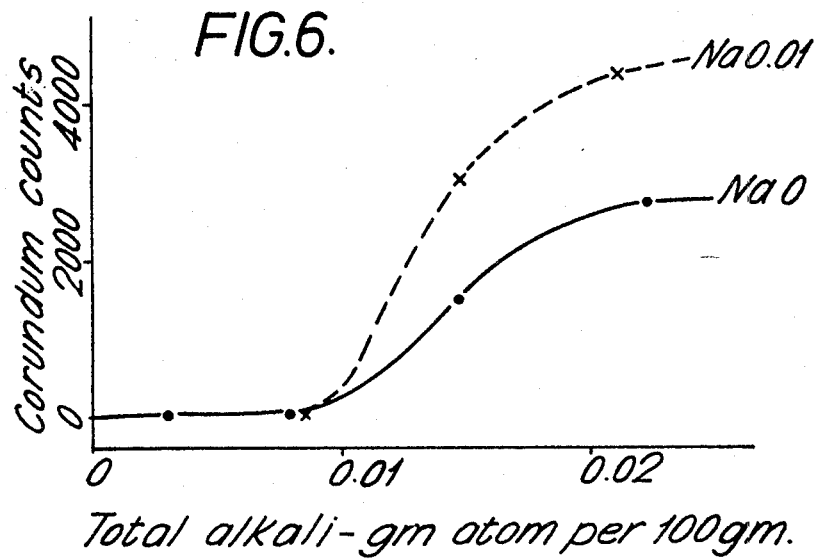

GAS MAKING CALCINED CATALYST PRECURSORS OF NICKEL, ALUMINA, SODIUM AND POTASSIUM

CROSS-REFERENCES TO RELATED APPLICATIONS

The present application is a Continuation Application of application Ser. No. 930,815, filed Aug. 3, 1978, now abandoned, which in turn was a divisional application of application Ser. No. 704,410, filed July 12, 1976, now U.S. Pat. No. 4,105,591.

BACKGROUND OF THE INVENTION

1. Field of the Invention

This invention relates to the reforming of hydrocarbons to make fuel gases such as gases containing a high content of methane. More particularly the invention relates to catalyst for use in the reforming of hydrocarbons, processes for the manufacture of such catalysts and the processes for the production of methane-containing gases employing such catalysts.

2. The Prior Art

The catalytic reforming of hydrocarbons with steam has been known for many years and was first developed for the production of hydrogen-rich gases. Such processes were carried out at high temperatures, e.g., about 700° C. The catalysts employed in such processes include nickel-alumina based catalysts in which the alumina was a resistant refractory material since the catalyst had to be able to withstand high temperatures. With light feedstocks such as methane it was possible to employ commercially practicable amounts of steam at high temperatures to avoid the problem of carbon deposition on the catalyst. However, as heavier feedstocks were used the excess of steam required to prevent carbon deposition rendered the process less commercially feasible with the existing nickel-alumina catalysts. In the late 1950s, modified catalysts were developed which were claimed to operate effectively at significantly lower steam to hydrocarbon ratios than those required for the existing nickel-alumina catalysts. These modified catalysts contained from 0.5 to 30% by weight of the catalyst of an alkali metal. Such catalysts are described in U.K. Patent Specification Nos. 966,882 and 966,883 and in the counterpart U.S. Pat. No. 3,119,667.

It was also known that methane-containing gases could be produced by effecting the Sabatier Reaction on gases containing hydrogen and carbon monoxide and that such hydrogen and carbon monoxide-containing gases could be produced by the high temperature reforming of higher hydrocarbons with steam.

The methane-containing gas was generally suitable as a 500 BTU Towns Gas. However, the combination of a first stage which was both endothermic and required high temperatures with an exothermic, lower temperature second stage led to difficulties in heat recovery and made efficient and economic production difficult to achieve.

In the mid 1950s the art of making methane-containing gas was considerably advanced by the advent of the Catalytic Rich Gas or CRG Process. This process was a steam reforming reaction of higher hydrocarbons over nickel-alumina catalysts at lower temperatures than those required for hydrogen production. In addition to the advantages that the use of low temperatures favored increased concentration of methane in the equilibrium product gas, the pressures employed enabled the gases to be transmitted and distributed without pumping facilities, and furthermore under the conditions employed the reaction could be performed in adiabatic reactors. This process was first described in U.K. Patent Specification No. 820,257. In the early days of the CRG process the catalysts were usually of low nickel content, e.g., of the order of 15% by weight. The increased activity necessary for low temperature operation was achieved by coprecipitating the nickel and alumina components. The coprecipitation of the nickel and alumina components resulted in the production of catalytically active transitional aluminas having high surface areas. Concomitantly, it was possible to achieve better distribution of the nickel over the support. Thus the structure of the catalysts differed considerably from those proposed both earlier and later for hydrogen production.

The CRG process has been considerably developed in view of the necessity of using heavier and heavier feedstocks and with the need to produce a substitute natural gas (SNG) to augment or replace depleted supplies of natural gas. The development of the basic CRG process and supplemental or ancilliary techniques has been described for example in U.K. Patent Specification Nos. 969,637, 994,278, 1,150,066, 1,152,009, 1,155,843 and 1,265,481 and in U.S. Pat. Nos. 3,415,634, 3,410,642, 3,433,609, 3,441,395, 3,459,520, 3,469,957, 3,511,624, 3,515,527, 3,625,665 and 3,642,460. These modified processes are themselves very efficient, but the governing constraint is the question of maintaining catalyst activity under the reforming conditions. Under conditions of high temperature reforming the main problem is to prevent carbon deposition by cracking or from the Boudouard Reaction. As recognised in the prior art, this problem can be alleviated by the use of excess steam. However, with heavier feedstocks the steam requirement becomes uneconomically excessive and it has been necessary to use alkali-promoted catalysts of the type described above. With low temperature reforming a problem associated with catalyst performance is a loss of activity owing to the deposition of polymeric substances on the catalyst surface.

In the early days of CRG operation polymer deposition was not so significant because relatively light feedstocks were available and working pressures required for Towns Gas production were relatively low. More recently world conditions have required the process to be available for heavier and more aromatic feedstocks and especially feedstocks other than 'straight run' feedstocks. The use of such feedstocks increases the risk of polymer formation.

The problems of polymer deposition were considered in the 1960s and in this respect the Specification of U.K. Patent Nos. 969,637 and 1,150,066 are addressed to this problem. Accordingly, it has been proposed to include an alkali and/or alkaline earth metal compound, preferably in amounts of from 0.75 to 8.6%, to overcome the problem of polymer deposition. Such additions were proposed for catalysts working conventionally at pressures of fom 10 to 25 atmospheres, i.e., relatively low pressures in CRG terms. It was found that although such additions benefited catalyst life as far as polymer deposition was concerned, the overall catalyst life was not as great as might have been expected. It was observed that polymer formation was a function of temperature and that higher preheat temperatures increased the catalyst's resistance to polymer deactivation. However, since the alumina components of the catalyst were transitional aluminas, the catalyst had a reduced resistance to sintering. It was further observed that the presence of the alkali had no beneficial or even deleterious, effect on the sinter resistance of the catalyst, and may even have a deleterious effect.

The recognition of this problem and the proposals for catalyst formulation to meet the need for catalysts having resistance to deactivation by both polymer formation and sintering are described in our U.K. Patent Specification No. 1,150,066.

In that Specification it is proposed that sintering could be significantly reduced and adequate resistance to polymer deposition achieved by reforming light hydrocarbons using a catalyst having alkali contents from 0.1 to 0.75%. Alkali values of 0.4 to 0.7 were preferred to achieve the optimum of minimum for polymer deposition resistance consistent with the maximum for sinter resistance. Thus, it was possible to produce catalysts having adequate polymer and sinter resistance. However, since the presence of alkali had both a beneficial and an adverse effect on the catalyst performance, it remained essential to carefully control the reaction temperature since the temperature at the inlet of the reactor had to be high enough to guard against severe polymer forming conditions and the temperature at the outlet low enough to prevent sintering.

Although Specification No. 1,150,066 discloses a broad range of alkali promoter, i.e., from 0.10 to 0.75 and operating at pressures up to 50 atmospheres, it is clear that such catalyst exhibiting the best performance had alkali contents of from 0.4 to 0.7% and were employed in steam reforming reactions at pressures ranging from 10 to 25 atmospheres.

Since the use of lighter feedstocks required but fairly low inlet temperatures to combat polymer deactivation, sintering problems were not encountered and the overall performance was generally satisfactory. However, when heavier feedstocks began to be used, increased inlet temperatures were required to counteract polymer formation and this in turn led to increased tendency to sintering and unsatisfactory life performance. The sintering problem with heavier feedstocks was accentuated at the higher pressures required for the production of SNG, such higher pressures favouring increased methane formation in the product gas.

SUMMARY OF THE INVENTION

We have found, surprisingly, that certain coprecipitated nickel-alumina catalysts have advantageous performance characteristics in the steam reforming of hydrocarbons, particularly heavier feedstocks, at the higher pressures, for example 600 psig and above, and that these catalysts are resistant to deactivation by both polymer formation and sintering. These catalysts are characterised by having little or no alkali and by the relationship between the alkali atoms, when present. This observed phenomenon is surprising in view of the teachings of the prior art. Furthermore, the catalyst compositions are novel since the routes known hitherto, would not yield catalysts which are in accordance with the present invention.

In accordance with the present invention there is provided a catalyst suitable for reforming hydrocarbons with steam at high pressures to produce methane-containing gases, which catalyst comprises of calcined coprecipitated nickel-alumina wherein the nickel content ranges from 50 to 65% by weight of the total weight of calcined, but unreduced catalyst and wherein the catalyst contains from 0 to not more than 0.43% potassium and from 0 to not less than 0.1% sodium and wherein the total of combined weight of sodium and potassium does not exceed 0.011 gm atoms/100 gm of catalyst and wherein the ratio of sodium to potassium falls within the area A B C D E shown in FIG. 1 of the drawings and that at a combined sodium and potassium content of from 0 to 0.05% the water loss (as herein after defined) is not more than 11.2.

We have found that the ratio between the nickel and alumina is an important feature as regards both the activity and the stability of the catalyst. Upon coprecipitation some of the nickel and alumina form a crystalline structure in which is incorporated water of crystallisation. The amount of water of crystallisation is a function of the crystallinity of the nickel-alumina compound and thus it is possible to determine the degree of crystallinity of the catalyst precursor. Assuming that all the nickel and all alumina has been incorporated into an undistorted crystal lattice, the amount of water of crystallisation is about 12%. We have found that for catalysts containing more than 0.05% K, the nickel and alumina can be present as wholly crystalline material and that even excess nickel or alumina can be present. However for the case where the catalyst contains none, or very little alkaline material, it is essential that at least part of the nickel and/or alumina should not be associated wholly in a crystalline form. This is expressed by the water loss. Thus, whereas a fully crystalline material has a practical water loss of about 12%, the low and no alkaline catalysts of this invention are required to have water losses of not greater than 11.2 and preferably about 9%. The catalysts of the invention having potassium contents about 0.05% can, though not essentially, have water loss values of not more than 11.2%.

The preferred weight ratio of nickel to alumina in the catalyst ranges from 2.8 to 3.2 Ni: 1 $Al_2O_3$ to give a corresponding nickel content of from 57 to 63% by weight.

Preferred catalysts of the invention have not more than 0.4% K, e.g., 0.1 to 0.4% K, and more preferably should not have more than 0.3% K, e.g., 0.2 to 0.3%. Although sodium may desirably be absent from the catalyst, it may be preferred to have sodium levels of about 0.01% particularly if potassium is also present.

Where both sodium and potassium are present, the ratio of sodium to potassium, expressed as a gram atom percentage, may be from $$\frac{30 - 10 \text{ Na}}{70 - 90 \text{ K}},$$

and commercially acceptable catalyst compositions may fall within the area defined by the lines OE, EX, XY, YB, BZ, ZO.

DESCRIPTION OF THE DRAWINGS

FIG. 5 is a graph plotting potassium content against sintered area for various sodium contents and FIG. 5 is a graph plotting total alkali content against Corundum counts for various sodium contents, these Figs. illustrating the sintering resistance of catalysts as a function of alkali content.

DETAILED DESCRIPTION OF THE PREFERRED EMBODIMENTS

Figure 1:
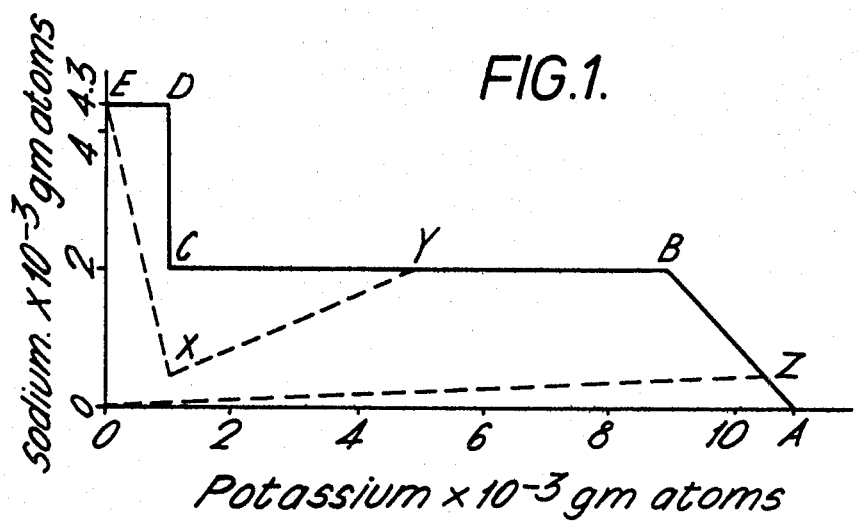
FIG. 1 of the accompanying drawings is a graph plotting the preferred relationship between sodium and potassium and wherein the lines AB, BC, CD and DE define the uppermost limit.

In terms of catalyst composition the catalyst should contain less than 0.005 gm/atom Na and not more than 0.011 gm/atom K, the total gm atom alkali should be less than 0.011 gm atom/100 gm catalyst.

As described aforesaid, the catalysts of the present invention are coprecipitated nickel-alumina catalysts. The techniques employed for coprecipitation are known and are described for example, in our U.K. Patent Specification Nos. 969,637, 1,150,066 and 1,155,843. Thus, in general terms, the catalyst precursor is formed by aiding a precipitating agent to a mixed solution of water soluble salts of nickel and alumina. The mixed precipitate is washed to remove the cations of the precipitant and any other water soluble compounds. Alternatively the precipitate may be formed by a reverse precipitation technique wherein the mixed nickel-aluminum salt solution is added to a volume of precipitating agent.

The precipitation stage may be effected at constant temperature or over a falling temperature range. The latter route is preferred for catalysts having a water loss value of 11.2 or less.

Any water soluble compounds of nickel and aluminum may be employed to produce the mixed salt solution. However, some chemical species have a deleterious effect upon the performance of the catalysts. Examples of such impurities include sulphur, copper and chloride ion. It is therefore desirable, or even essential, that compounds containing these elements should not be employed. Nitrates of nickel and alumina have been found to be particularly suitable for use as catalysts precursors.

Suitable precipitating agents have been found to be water soluble compounds of sodium and potassium especially the hydroxides, carbonates and bicarbonates. However, sodium and potassium should either be absent or present in only small and related amounts in the final catalyst. In particular the sodium level permitted is very small and this may appear to be a disadvantage since on a commercial basis sodium compounds are preferred as the precipitant since they are cheaper than the potassium counterparts. However, whatever the precipitant used, it is necessary to wash the precipitate to remove as much as possible of the water soluble compounds, and even assuming that the potassium or sodium level has been adjusted to the proper concentration, there still remains the problem of adjusting the Na/K ratio.

Furthermore, it has been observed that when simply washing and filtering the catalyst precursors to these very low levels of sodium and potassium, the precursors become very difficult and even, on occasions, impossible to handle.

We have found that nickel-alumina precursors containing very little sodium and/or potassium and produced by coprecipitation utilising sodium or potassium precipitants can be effectively handled by deliberately adding a filtering aid comprising the carbonates or nitrates of sodium, potassium or ammonium carbonate, back into the wash liquor employed for washing the precipitate.

The level of filtering aid in the wash liquor may be up to about 100 ppm for the sodium and potassium compounds and up to 200 ppm for ammonium compounds. Since, obviously, the addition of sodium and potassium salts may interfere with the careful control needed for the no-alkali or extremely low levels of alkali in the catalysts of the invention it may be desirable to use ammonium carbonate as the filtering aid.

The exact reason for the beneficial effect of the use of these filtering aids remains uncertain inspite of our findings. It is obviously not simply an effect of ionic strength of the solution since there would be no reason for the poor performance of ammonium nitrate which was investigated during our researches; after all ammonium nitrate contains more ions, weight for weight than do sodium or potassium nitrates, both of which we have found effective filtering aids.

The use of ammonium carbonate as an effective filtering aid is even more surprising for another reason. Previously the use of ammonium salts in the production of nickel based catalysts had been avoided because of the possibility of the nickel and ammonium ion reacting to form soluble nickel ammines, thus losing nickel from the catalyst during the washing stages. As hereinafter described, there was no sign of any coloured compounds in the filtrates that would be expected if nickel ammines were formed and this was confirmed in the final nickel determination of the catalyst which showed that no large scale loss of nickel was observed.

After the final filtering stage the catalyst is ready for the final adjustment of the alkali level, if necessary, and the treatment to alter the degree of crystallinity of the precursor lattices. For catalysts having water loss values of 11.2 or less it is preferred that the washing steps are carried out at temperatures of less than 60° C.

Adjustment of the alkali level and ratio, when necessary, is effected by mixing the wet filter cake after the final filtration with a potassium and/or sodium ion containing solution wherein the concentration and ratio of alkali metal is at a predetermined level.

The adjustment of degree of crystallinity of "water loss" value is effected either upon the damp filter cake, after any necessary adjustment of level or ratio of alkali metal, by heating the catalyst precursor mass at about 100° C. in a moist atmosphere for a predetermined period of time. It is then quickly dried. Generally for water loss values of not more than 11.2 we have found that heating for periods of from 1 to 8 hours to be satisfactory. However, for catalysts required to have a very low degree of crystallinity, good results are achieved by drying the damp filter cake rapidly in a stream of hot air at from 110°–120° C.

The "water loss" value for the catalyst is determined by measuring the total loss in weight of the dried catalyst precursor (as a percentage of the original weight) between the temperatures of 150° to 270° C. when heated at a rate of 15°/min. in a dry stream of inert gas, such as air or nitrogen, at ambient pressure.

The catalyst is finally calcined and pelleted under the known conditions for coprecipitated nickel-alumina catalysts to produce the catalyst in an oxide form.

The catalyst is usually transported and loaded into the reactor vessel in the oxidic form, final reduction of the catalyst to its active form being done in situ.

Thus in addition to novel catalyst composition, the present invention also provides a novel process for manufacturing coprecipitated nickel alumina catalysts wherein a mixed slurry of precipated water insoluble compounds of nickel and aluminium are produced, the slurry is washed and filtered a plurality of times, at least during the last time the washing liquor comprises water and a filtering aid selected from about 100 ppm of sodium or potassium carbonate or nitrate or about 200 ppm of ammonium carbonate and wherein the finally washed and filtered slurry is dried, calcined and reduced.

Preferably the catalyst is pelleted after calcination.

According to a further preferred embodiment, the catalyst precursor is subjected to heating at about 100° C. in a moist atmosphere for a period of from 1 to 8 hours to yield a "water loss value" as hereinbefore defined, of less than 11.2, prior to the drying stage.

The following Examples are given to illustrate the preparation of catalysts of the invention employing the method thereof.

EXAMPLE 1

(a) 15.9 kg of nickel nitrate (hydrate) and 7.9 kg of aluminium nitrate were dissolved in 80 liters of deionised water. Separately 12.2 kg of anhydrous sodium carbonate was dissolved in 64 liters of deionised water. The sodium carbonate solution was heated to boiling and the nitrate solution to 93° C. The carbonate solution was added to nitrate solution slowly over a period of 45 minutes, during which time the temperature of the forming slurry was maintained at 92°–93° C. At the end of the precipitation period the slurry was gently boiled for 30 minutes. The slurry was then filtered for 65 minutes. The cake was washed by repeated reslurrying and washing on the filter (a total of 5 filtrations), to remove the sodium. On the final filtration the slurry became very difficult to filter and the filtration was abandoned after 95 minutes.

At the shut down of the final filtration about half the volume of slurry remained unfiltered but in an effort to improve the filtration rate the slurry stirring was turned off for most of this filtration so that settling out occurred and thus increased the solid content of the slurry being pumped to the filter pan. Thus, although only half the volume of slurry had been filtered, only about ⅓ of the cake remained unfiltered.

The unfiltered slurry left after the filtration description was stood over night and then to it was added 23 gms of anhydrous sodium carbonate—enough to give roughly 100 ppm sodium in the slurry. The addition of this sodium carbonate caused a dramatic improvement in the filtration rate and the residual slurry was filtered in about 20 minutes. The cake from this filtration was stored for 11 weeks in a sealed plastic bag before being used to make a slurry for filter testing. To make the filter test slurry 7.2 kg of the cake were made up to 70 liters with dionised water. This slurry was used for the following experiments. This slurry filtrate had a sodium content of 7.4 ppm.

Filter Leaf Experiments

The filter leaf used in these experiments consists of a hard rubber composition disk 11 cm in diameter and about 1 cm thick. The front face of the disk consists of a series of ridges and channels, the channels leading to a central vacuum connection which emerges from the back of the disk as a ⅜ inch o.d pipe. The face of the disk is covered with a stainless steel mesh screen to prevent the filter medium (cloth) being sucked into the channels.

In the first set of experiments (Set 1) the filter medium was a cotton twill cloth. The cloth was held in place by a large hose clip (Jubilee Clip) tightened round the outside of the filter leaf. It is apparent from the results obtained that the filtration properties of the cloth were changing during the experiment so this arrangement was only used for the first set of experiments. In all other experiments (Sets 2-4) the filter medium was a filter paper—a fresh paper for each test. To provide a backing for the filter paper the leaf was clothed with a nylon cloth; nylon being chosen for its very low water absorption and hence stability. The nylon cloth was fixed to the filter leaf by nichrom wires laid over the cloth round the edge of the filter leaf disk. The wires were covered over with PVC insulating tape. A 15 cm filter paper was applied over the cloth the edges of the filter paper being bent over the edge of the disk and held in place by an elastic band stretched round the edge of the disk.

For most tests a one liter portion of slurry was placed in a metal beaker 19 cm diameter and 19 cm high. The salt was added either in the form of a solid or a concentrated solution and was well mixed into the slurry. The time from adding the salt to carrying out the filtration test was roughly five minutes. The suction for the filter leaf was provided by the vacuum pump and receivers normally used for a rotary vacuum filter; the filter leaf being attached to one of the receivers by a rubber vacuum hose. Because the vacuum changed with the amount of air coming through the filter leaf a standard procedure was adopted. The filter leaf was attached to the vacuum hose and the filter medium moistened by squirting it with water. The vacuum was then sealed off from the leaf by compressing the hose. This caused the vacuum in the receivers to rise, and when this vacuum had reached 20 inches of mercury the filter leaf was placed in the slurry and the hose opened. The back surface of the filter leaf disk was positioned roughly level with the slurry surface. The time of immersion of the leaf was exactly one minute, this being about the time of immersion of one of the sectors on the rovac filter on the speed setting used in most preparations. During the immersion the slurry was gently agitated by slowly stirring it with a spatula (palette knife) with a degree of agitation intended to match that in the rovac pan.

At the end of each test the filter cake was allowed to suck dry for about two minutes. In Set 1 using the cotton cloth a compressed air line at about 5 psig was applied to the filter leaf vacuum connection which lifted the cake off the cloth. The cake was then carefully scraped off into a weighed evaporating dish. The cake was dried in the fan oven at 125° C. for at least two hours. In Set 1 the cake was weighed before and after drying to give a weight loss on drying figure (LOD). In all the other experiments using the filter paper the air line was not used. At the end of the test the cake was sucked dry and the leaf filter removed from the vacuum line. The cake and filter paper were then released by carefully pulling off the elastic band over the back of the filter. The filter paper, complete with cake, was then dropped into a weighed evaporating dish for drying. Because of uncertainty about the weight of a wet filter paper no loss on drying figures were measured for these samples.

Set 1. Ammonium Nitrate

The experiments of this set were done using the cotton filter cloth. The salt concentrations used were obtained by adding weighed quantities of ammonium nitrate to 1 liter portions of slurry. The results obtained are given in Table 1. Three blank tests, with no added salt, were done and they are listed in the Table in the positions they occupy in the sequence of experiments. It can be seen that there is a very large fall in base value from 4611 mg to 3287 mg in the experiment and this is almost certainly due to changes in the filter cloth during the experiment—either blocking of the pores with catalyst or swelling of the cotton cloth fibres due to slow uptake of water—and for this reason filter papers were adopted for the rest of this work.

TABLE 1

| Salt Conc[n] ppm | Weight of salt mg | Yield of Dry Cake mg | L.O.D. % |
|---|---|---|---|
| 0 | 0 | 4611 | 71.6 |
| 20 | 20 | 4536 | 72.6 |
| 40 | 40 | 4499 | 72.1 |
| 60 | 60 | 4255 | 72.9 |
| 100 | 100 | 4240 | 72.1 |
| 150 | 150 | 4316 | 72.3 |
| 0 | 0 | 3936 | 72.3 |
| 200 | 200 | 4149 | 72.9 |
| 400 | 400 | 4749 | 71.8 |
| 600 | 600 | 5061 | 71.9 |
| 1000 | 1000 | 5075 | 72.1 |
| 0 | 0 | 3287 | 72.2 |

Set 2. Ammonium Nitrate

Figure 2:
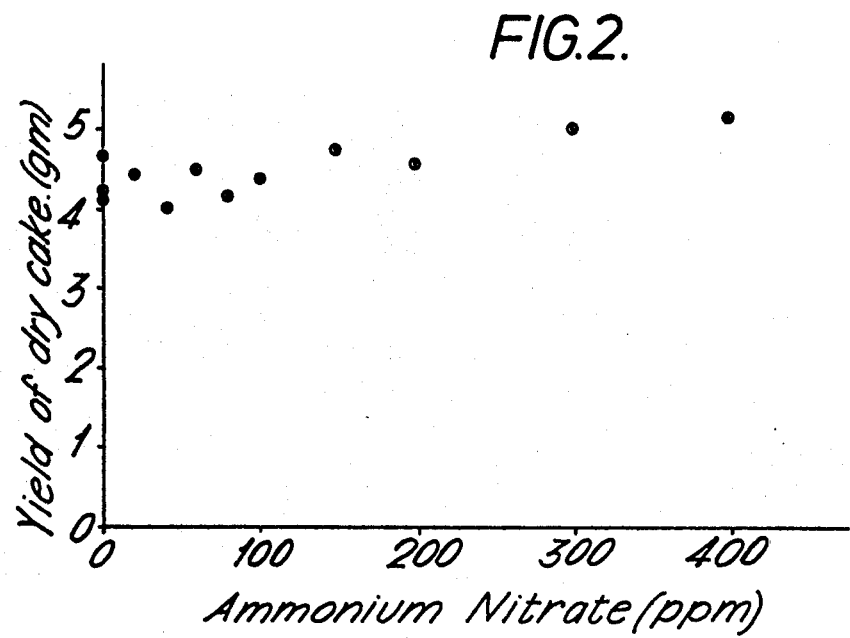
FIG. 2 is a graph plotting ammonium nitrate concentration against yield of dry cake and illustrates the effect of using ammonium nitrate as a filtering aid.

These experiments were done exactly as Set 1 except that a filter paper medium was used rather than cotton cloth. The results are listed in Table 2 (Set 2). The three blank values quoted were done in the same positions in the sequence as in Set 1, ie at the start, between 150 ppm and 200 ppm and at the finish; it can be seen that they are reasonably constant. The results of the tests from 0 to 400 ppm ammonium nitrate are plotted in FIG. 2 of the accompanying drawings and illustrate the amount of scatter found in these tests. The full results for the higher range are plotted in FIG. 3 (on a different scale) which compares the results with Sets 3 and 4.

Set 3. Ammonium Carbonate

The experiments in this set were done exactly as Set 2. The salt used was commercial ammonium carbonate ($NH_4HCO_3 \cdot NH_4CO_2NH_2$). The results are listed in Table 2 (Set 3) and plotted in FIG. 3.

Set 4. Sodium Nitrate

The experiments in this set were done at Set 2. The results are listed in Table 2 (Set 4) and plotted in FIG. 3.

TABLE 2

| Set 2 Set 3 Set 4 Salt conc ppm | Salt Weight mg | Set 2 | Set 3 | Set 4 |
|---|---|---|---|---|
| 0 | 0 | 4660 | | 4185 |
| | | 4152 | | |
| | | 4242 | | |
| 20 | 20 | 4469 | | |
| 40 | 40 | 4003 | | |
| 60 | 60 | 4536 | | |
| 80 | 80 | 4182 | | |
| 100 | 100 | 4405 | 6150 | 6266 |
| 150 | 150 | 4783 | | |
| 200 | 200 | 4606 | 6350 | 6165 |
| 300 | 300 | 5029 | 6591 | 6130 |
| 400 | 400 | 5194 | 6598 | 6396 |
| 500 | 500 | 5580 | 6745 | 6118 |
| 700 | 700 | 5922 | 6420 | 6312 |
| 1000 | 1000 | 6007 | 6483 | 6303 |

Figure 3:
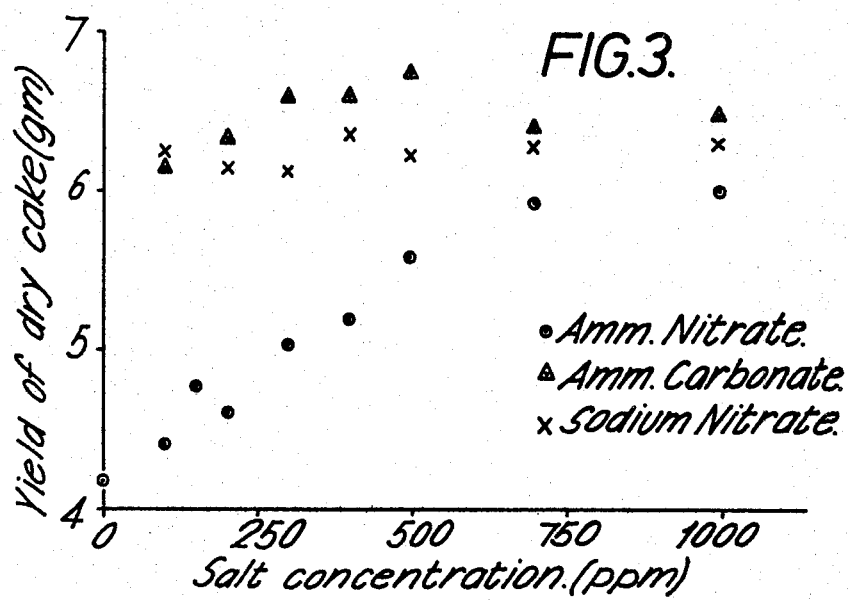
FIG. 3 is a graph plotting the concentrations of various salts against yield of dry cake and compares the various salts with respect to efficiency as filtering aids.

FIG. 3 shows quite clearly that ammonium carbonate and sodium nitrate are effective in promoting filtration at much lower concentrations than in ammonium nitrate.

The one-off experiment in which sodium carbonate was added to the residual slurry of the preparation demonstrated quite clearly that the severe filtration problems encountered when slurries were washed to very low sodium levels could be reversed by adding sodium ions back. During filtrations it was noted that the catalyst tended to settle out to a certain extent, leaving a clear supernatant liquor if the slurry was not kept well stirred. However, when the lowest sodium level and poor filtering properties were reached it was found that although settling did occur it was not complete and a milky supernatant liquor remained. The addition of sodium carbonate was found to clear the supernatant liquor at the same time as improving the filtration. Small scale, non quantitative tests showed that the supernatant liquor was also cleared by ammonium carbonate and ammonium nitrate, so these compounds were chosen for leaf tests. Visual observations throughout the experiments tended to confirm this correlation of a cloudy supernatant liquor with poor filtration rates.

EXAMPLE 2

This Example is given to illustrate the preparation of catalysts have different crystallinities as characterised by their water loss values.

Two aqueous solutions were prepared, one containing 15.3% $Ni(NO_3)_2$ $6H_2O$ and 7.6% $Al(NO_3)_3$ $9H_2O$ and the other containing 16.0% $Na_2CO_3$. Both solutions were brought to the boil and the carbonate solution added to the nitrate solution over a period of 45 minutes, neither solution being heated during the addition. After formation of the precipitate, the slurry was not heated but washed with deionised water and filtered. The washing and filtering steps were repeated for a further four times. For the last washing step 200 ppm of ammonium carbonate was added to the wash liquor.

Figure 4:
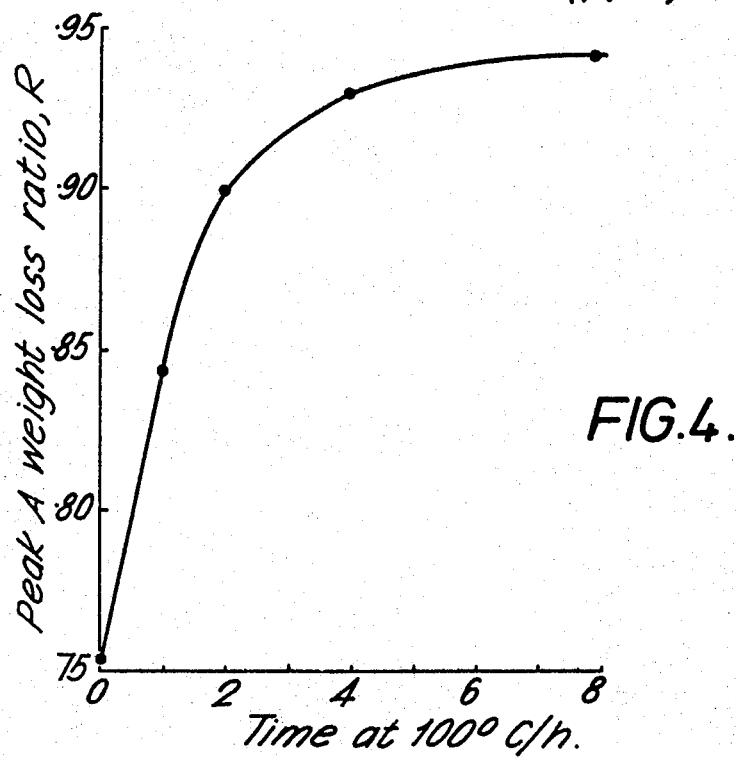
FIG. 4 is a graph plotting Peak A ratio against R against time of heating and illustrates the effect of heating in accordance with Example 2 on crystallinity.

The finally filtered cake was then divided into samples and each sample packed into a closed test tube to give a cake thickness of not more than 2–3 cm. The test tubes were immersed in boiling water for periods range from 1 to 8 hours after which the wet cake was dried a thin layer at 110°–120° C. The dried samples were than subjected to thermogravimetric analysis to determine their crystallinities. FIG. 4 illustrates the plot of Peak A ratio, R against time of heating at 100° C. wherein $$R + \frac{\text{\% weight loss of catalyst from } 150°-270° \text{ at } 15°/\text{Min}}{12}$$

The catalysts of the present invention have advantageous characteristics, which are surprising in view of teaching of the prior art. They have superior performances as regards both stability and activity over conventional nickel-alumina catalysts.

The relationship between the resistance of the catalyst to sintering and the level and ratio of alkali is an extremely complex one. Referring again to FIG. 1 of the drawings it will be seen that acceptable performance characteristics are obtained for potassium levels of from about 1 to $9 \times 10^{-3}$ gm atoms 100 gm catalyst provided that the sodium level does not exceed $2 \times 10^3$ gm atoms/100 gm catalyst. At the higher end of the potassium range, ie from $9-11 \times 10^{-3}$ gm atom/100, the sodium level has to drop correspondingly so that the total alkali level does not exceed $11 \times 10^{-3}$ gm atoms/100 gm. At the lower end of the potassium range, ie below $1 \times 10^{-3}$ gm atoms/100 gm it will be observed that the sodium level can exceed $2 \times 10^{-3}$ gm atoms/100 gm and may exceed the potassium content with the proviso that the total alkali content does not exceed $4.3 \times 10^{-3}$ gm atoms/100 gm and may be as low as no alkali at all.

The level of potassium relative to the sodium content and the sinter resistance is demonstrated in FIG. 5 of the drawings. In the demonstration two catalyst series were tested for sintering. The ordinate expressed as sintered area, shows the area which remains after sintering. Thus, the greater is the value, the greater will be the unsintered area. The abscissa expresses the potassium content of the catalyst. The first catalyst series contained a fixed level of sodium at 0.2% and the second contained no sodium. It will be seen that for catalysts containing no sodium that sinter resistance rises with the addition of potassium to a peak, falls rapidly and then rises when the potassium concentration falls within the prior art ranges. The presence of the peak at the potassium level of 0.3 is surprising in view of the teachings of the prior art which indicate the expected improvement from 1.0 to 2.6% K. The graph also illustrates that at very low levels of potassium the presence of sodium has beneficial properties, as shown by the sinter curve for 0.2% Na catalysts. Further experiments with these catalysts has demonstrated other unexpected advantages. Performance tests on the catalysts containing no sodium have indicated that catalysts containing potassium in amounts less than 0.3% K are better than those having corresponding amounts more than 0.3% K. The reason for this is not entirely clear except that the poor behaviour of catalysts containing more than 0.3% K is probably attributable to the formation of corundum during the test. The is demonstrated in FIG. 6 of the drawings which shows the variation of potassium with corundum counts. The presence of increased amounts of sodium, with increasing amounts of potassium, increases the catalysts susceptibility to sintering due to increased corundum formation is clearly shown in FIG. 6. Thus, although it appears from FIG. 4 that catalysts having less than 0.3% may appear to have decreasing resistance with decreasing potassium, the unexpected lack in decrease in performance is associated with the resistance to corundum formation.

The present invention further provides a process for the production of methane-containing gases, which process comprises passing the vapour of a hydrocarbon feedstock having a boiling point of not greater than 350° C. and steam over a catalyst in accordance with the invention, said reaction being carried out at an elevated pressure and at a temperature of from 350° C. to 550° C. at the inlet of the catalyst with an exit temperature of at least 450° C. and preferably at least 500° C.

The temperature to which it is necessary to preheat the hydrocarbon vapour and steam in order to maintain the catalyst bed at a temperature within the aforesaid range depends on the relative proportions of the hydrocarbons and steam and on the pressure under which the process is carried out. However, the preheating temperature will always be above 350° C. to ensure sufficient activity of the catalyst.

The pressure may be up to 100 atmospheres, but may be higher, if desired. Convenient pressures are within the range of 45 to 100 atmospheres.

In order to avoid the deposition of carbon on the catalyst the proportion of steam relatively to hydrocarbons is greater than that which enters into reaction. The excess of steam required for this purpose depends on the average molecular weight of the hydrocarbons used, and increases with an increase in molecular weight. However, the excess is not great, and 2 parts by weight of steam to 1 part by weight of hydrocarbons can be used with all mixtures of hydrocarbons containing an average of 4 to 10 carbon atoms. A larger proportion up to 5 parts by weight of steam to 1 part by weight of hydrocarbons may be used, and in the case of hydrocarbon mixtures containing an average of 4 to 7 carbon atoms the proportion of steam may be as low as 1.5 parts by weight.

The lower the temperature of the catalyst bed the higher is the content of methane in the gas produced, and the higher the pressure the higher is the methane content. The gas produced, after the removal of carbon dioxide and water vapour therefrom will generally contain at least 50 percent by volume of methane, and the concentration of methane may exceed 80 percent under relatively high pressure, such as 50 atmospheres.

The outlet temperature will be a function of the preheat temperature for the reactants and the pressure at which the reaction is carried, the feedstock and steam to feedstock ratio. Thus high working pressures, e.g., in excess of 450 psig and low steam to feedstock ratios may cause a high outlet temperature for heavier feedstock eg LDG 170 (SG 0.7–0.72 naphtha) preheated to but relatively low temperatures.

The process and catalysts of the invention are further characterised in that feedstocks having greater molecular weights than hitherto employed may be gasified in accordance with the present invention.

In addition to a single stage gasification process, the present invention further provides for multi stage gasification processes for producing methane containing gases. Such processes are described for example in U.S. Pat. Nos. 3,420,642, 3,459,520, 3,511,624, 3,625,655 and 3,643,460 which are incorporated herein by reference for reasons of brevity.

However, these processes are modified by the use of catalysts in accordance with the invention and by the fact the feedstock specification may be extended to higher boiling distillate oils. The use of the instant catalysts enables high pressures of the order of 45 to 100 atmospheres to be employed to maximise methane production.

The invention therefore provides the following processes for the gasification of hydrocarbons to produce methane containing gases wherein the term "catalyst" is defined to mean a catalyst in accordance with the invention.

1. A process for the production of gases containing methane in at least two stages from vaporised predominantly paraffinic hydrocarbons, wherein a first stage comprises passing a mixture of steam with part of the vaporised hydrocarbons, which mixture is at a temperature of at least 350° C., through a bed of catalyst, the catalyst being maintained by the reaction at temperatures of from 400° C. to 550° C., and at least one further stage comprising mixing with the gaseous product of the first stage a further part of the vaporised hydrocarbons, and passing the mixture thus formed through a further bed of catalyst, the catalyst being maintained by the reaction at temperatures of from 400° C. to 600° C., the ratio of the total weight of steam to that of the total hydrocarbons being greater than 1.0 to 1, e.g., 1.6 to 1.

2. A process for the production of gases containing methane by reaction of the vapour of paraffinic hydrocarbons with steam over a bed of catalyst at a temperature of at least 350° C. whereby hot reaction gases are produced which contain steam, and recycling a portion of the reaction product gases and mixing them with the mixture of hydrocarbon vapour and steam to be reacted prior to passage of the mixture through the bed of catalyst, the ratio of the recycled portion of the reaction product gases to the reaction product gases to the reaction product gases removed from the system being 0.5–50 volumes to one volume, the bed being maintained at temperatures of from 400° C. to 600° C. and substantially no carbon deposition takes place on the catalyst.

3. A process for making a gas containing a high proportion of methane from a reactant mixture comprising methane, hydrogen, carbon monoxide, carbon dioxide, and 30 to 60% by volume of steam, the methane concentration being at least 25% by volume of the mixture, which method comprises passing the reactant mixture in a first methanation stage over a methanation catalyst, the temperature of which is from 200° C. to 450° C., removing at least part of the steam from the mixture leaving the first methanation stage and cooling the mixture passing the mixture in a second methanation stage over a methanation catalyst, the temperature of which is within a range the upper limit of which is lower than the exit temperature of the mixture from the methanation catalyst of the first methanation stage so that further methanation takes place, the amount of steam present in each of the stages being at least sufficient to prevent carbon deposition on the catalyst, and subsequently removing carbon dioxide and any remaining steam from the mixture.

4. A process for the production of a gas containing at least about 85% methane by volume on a dry, carbon-dioxide-free basis, the process comprising contacting an inlet gaseous mixture of water and naphtha with catalyst in a first catalytic reaction zone; maintaining the minimum temperature in the zone at a level of about 400° C. and the maximum temperature at a level of no greater than about 800° C. to produce an intermediate gas product containing at least about 10% methane by volume, on a dry basis, together with hydrogen, carbon oxides and residual water; the intermediate gas product being cooled to a temperature within the range of from about 300° to about 400° C. by directly admixing with it a coolant which is at least partially naphtha, any other portion being water, and which coolant is at least partially liquid; contacting the cooled gaseous mixture with a steam reforming catalyst in a second catalytic reaction zone at substantially lower temperatures than the temperatures in the first zone to produce a final product containing a greater precentage of methane than the intermediate gas product; and removing water from the final gas product. Preferably, the steam reforming catalyst is a catalyst in accordance with the present invention.

5. The invention thus provides a process for the production of a gas containing at least 90 percent by volume of methane on a dry carbon dioxide-free basis, which process comprises; (i) preheating to a temperature of 400° C. to 500° C. a reactant mixture of steam and the vapour of a predominately paraffinic hydrocarbon feedstock and introducing the preheated mixture into a first catalytic reaction zone in which the mixture reacts in the presence of a fixed bed of catalysts at a temperature of 400° C. to 550° C. to give a gas containing methane, hydrogen, carbon oxides and undecomposed steam, cooling the zone by an internal heat exchanger, the outlet of the catalyst bed being maintained by the heat exchanger at a temperature below that at which the reactant mixture is introduced into the zone; (ii) introducing the stage (i) product gas into a second catalytic reaction zone in which the constituents of the gas react in the presence of a fixed bed of a methanation catalyst at a temperature of 200° C. to 450° C. to increase the methane concentration and cooling the second zone by an internal heat exchanger; (iii) removing steam from the gas leaving stage (ii) by cooling the gas with water, and (iv) passing the water which has been used to cool the gas in stage (iii) through the heat exchanger of the second catalytic reaction zone to cool that zone and to convert the water into steam; passing at least part of the steam removed from the heat exchanger of the second catalytic reaction zone through the heat exchanger of the first catalytic reaction zone to cool that zone and using at least part of the steam removed from the heat exchanger of the first catalytic reaction zone as the process steam in the reactant.

In yet another embodiment the catalysts of the invention may be employed for the gasification of hydrocarbons to produce mixtures of carbon dioxide by the process described in U.S. Pat. No. 3,441,395, incorporated herein by reference.

A process for the production of gases containing methane by reaction of the vapour of paraffinic hydrocarbons with steam, which process comprises passing a mixture of steam and a hydrocarbon vapour in the ratio of at least 2.0:1 lbs. and at a temperature of at least 350° C. into a bed of catalyst, the maximum temperature in the catalyst bed being maintained at not more than 600° C., whereby substantially no carbon deposition takes place on the catalyst, passing the gaseous mixture produced in this gasification stage through at least one pair of stages comprising first, an externally fired preheater and secondly, a reforming stage in which the preheated gases are subjected to the action of a reforming catalyst at a temperature above 550° C. to bring about the conversion of methane contained therein by reaction with steam to form carbon monoxide and hydrogen whereby the methane content of the mixture is reduced, the preheater providing heat which is absorbed by this endothermic reaction.

The processes of the present invention may be employed for gasifying the whole range of vapourisable hydrocarbon feedstocks, examples of such feedstocks being propane, butane LPC, light distillate naphthas, heavy naphthas, kerosines and mixtures therefrom. The catalysts of the invention are generally suitable for carrying out known gasification processes, but are especially suitable for the gasification of heavy naphthas and kerosines.

The following set of Examples are given to illustrate the preparation of catalysts of this invention, to illustrate their performance in the high pressure gasification of hydrocarbons to produce methane containing gases and to compare their performance with catalysts of the prior art.

EXAMPLE 3

A catalyst base preparation was prepared as follows:

The Chemicals Used

The chemicals used were:
Nickel Nitrate, hydrate 31.8 Kg
Aluminium Nitrate, hydrate 15.8 Kg
Sodium Carbonate, anhydrous 24.4 Kg The nitrates were dissolved in 80 liters of water and the carbonate in 64 liters. Demineralised water was used in all stages of preparation.

The Precipitation

Both solutions were heated to boiling, then the heat turned off and the nitrate slowly added to the carbonate. The times of the various stages are given in Table 3.

TABLE 3

| | |
|---|---|
| Precipitation Temperature (start) | 99° |
| Precipitation Temperature (finish) | 66° |
| Time of precipitation | 46 minutes |
| Time from end of precipitation to start of heating | 6 minutes |
| Temperature before heating | 65° |
| Time of heating | 35 minutes |
| Boiling point | 101° |
| Boiled for | 30 minutes |
| Number of washes | 5 |
| Temperature of reslurry | 90° |
| Temperature of water spray | 80–90° |
| Total time of washing | ca 11 hours |
| Drying temperature (fan oven) | 110° |
| Calcination temperature | 450° |
| Calcination time | 2 hours |
| Pelleted | ⅛ × ⅛ inch |

At the end of the precipitation 1.8 liters of slurry, 1% of the total were removed and washed on a Buchner.

The remaining slurry was stirred for a few minutes then heated to boiling and boiled for 30 minutes.

Filtration and Washing

After precipitation and boiling the slurry was pumped to the rotary vacuum and filter. After the initial filtration the cake was given five washes. At each wash it was reslurried with enough water to make 180 liters of slurry. The slurry was heated to 90° before filtration, but the temperature was allowed to fall during the filtration. In the initial filtration and in the first four washes both spray bars on the filter were used. They were supplied with hot water from the large mixing tank which maintained a temperature at the spray bar of about 80°–90°. The times of the stages of filtration are given in Table 3.

Potassium Addition and Drying

The yield of cake from the final filtration was 64.15 Kg including 4.3 Kg obtained by filtering the filter trough residue on a Buchner filter. This cake was divided into two portions, each of 32 Kg. The first batch (3A) blended with 22.5 gm of anhydrous potassium carbonate dissolved in 4.8 liters of water. The second batch (b) was similar but the potassium carbonate amount was 61 gm. After mixing each portion was spread over an oven tray to form a layer about 2 cm thick. Each tray was then dried overnight in the fan oven set at 110° with the vent fully open. The potassium addition process and drying were spread over two days.

The total yield of dry cake was 7.0 kg for each batch.

Calcining and Pelleting

The batches of dry cake were each spread over two oven trays and were then calcined together for 2 hours in the fan oven set at 450° (vent closed). Each batch yielded 4.7 kg of calcined catalyst. The calcined catalyst was ground to pass a 22 mesh sieve then mixed with 2% graphite and pelleted ⅛ × ⅛ on the rotary pelleting machine.

Catalyst A had a sodium content of 0.05% and potassium content of 0.25 whereas catalyst B had a sodium content of 0.03% and a potassium content of 0.62%. Both catalysts were subjected to a gasification test in which a hydrocarbon feedstock (LDF 170 Naphtha) and steam (Steam/Naphtha ratio=2:1) was passed over each catalyst. The steam/naphtha mixture was preheated to 450° C. and the reaction conducted at 600 psig. The performance of each catalyst was determined by the time taken for the reaction zone to extend a fixed distance down the catalyst bed, the longer the time taken indicating the better performance. The following table illustrates the results, catalyst A being a catalyst of the invention, whereas catalyst B was according to the prior art.

| | Time (hr) to extend 3.5 ft |
|---|---|
| Catalyst A | 481 |
| Catalyst B | 145 |

EXAMPLE 4

A coprecipititated catalyst slurry was prepared by dissolving 31.8 kg nickel nitrate hydrate hydrate and 15.8 kg aluminium nitrate hydrate in 80 liters of deionised water to form a first solution, 24.4 kg of anhydrous sodium carbonate in 64 liters of deionised water and adding the carbonate solution to the nitrate solution.

Before the start of precipitation the carbonate solution was heated to boiling and the nitrate to about 93°. The carbonate was added slowly, and as far as possible steadily, to the nitrate solution over a period of 50 minutes. The temperature of the nitrate slurry was controlled by admitting steam to the jacket of the precipitation vessel. A very good temperature control could be achieved by careful adjustment of the steam flow. During the precipitation the slurry temperature was kept in the range 93°–94°. The slurry was heated to boiling after precipitation and boiled for 30 minutes.

The filtration was conducted using a rotary vacuum filter. After each filtration the cake was dropped into hot water and reslurried, sufficient water being added at the end to give a total of 180 liters. This slurry was heated to 90° before being pumped to the filter for the next filtration. In the final filtration the cake was collected in a steel try. In the final filtration ammonium carbonate was added to a concentration of 200 ppm.

At each filtration stage a sample of filtrate was taken from the sampling loop on the filter, and these samples were analysed for sodium content by flame photometry.

After the final filtration, a cake weighing 48.4 Kg was obtained.

For the potassium addition the cake was divided into two equal portions. To each portion respectively potassium carbonate (anhydrous) was added at 20.32 gm to form catalyst 4A and to the other portion at 60.8 gm to form catalyst 4B. The potassium carbonate was added by dissolving in about one liter of water and blending with the cake to form a thick paste. The portions of paste were each spread over a tray in a fan oven to give a layer about 2-3 cm thick and dried at 125°.

After drying each portion was calcined at 450° for 2 hours. The calcined product was crushed to pass a 22 mesh sieve, mixed with 2% graphite and pelleted to $\frac{1}{8} \times \frac{1}{8}$ inch size.

The final potassium content for catalyst A was 0.21%, and 0.48% for catalyst B. The sodium content for both catalysts was below the detectable limit.

Figure 7:
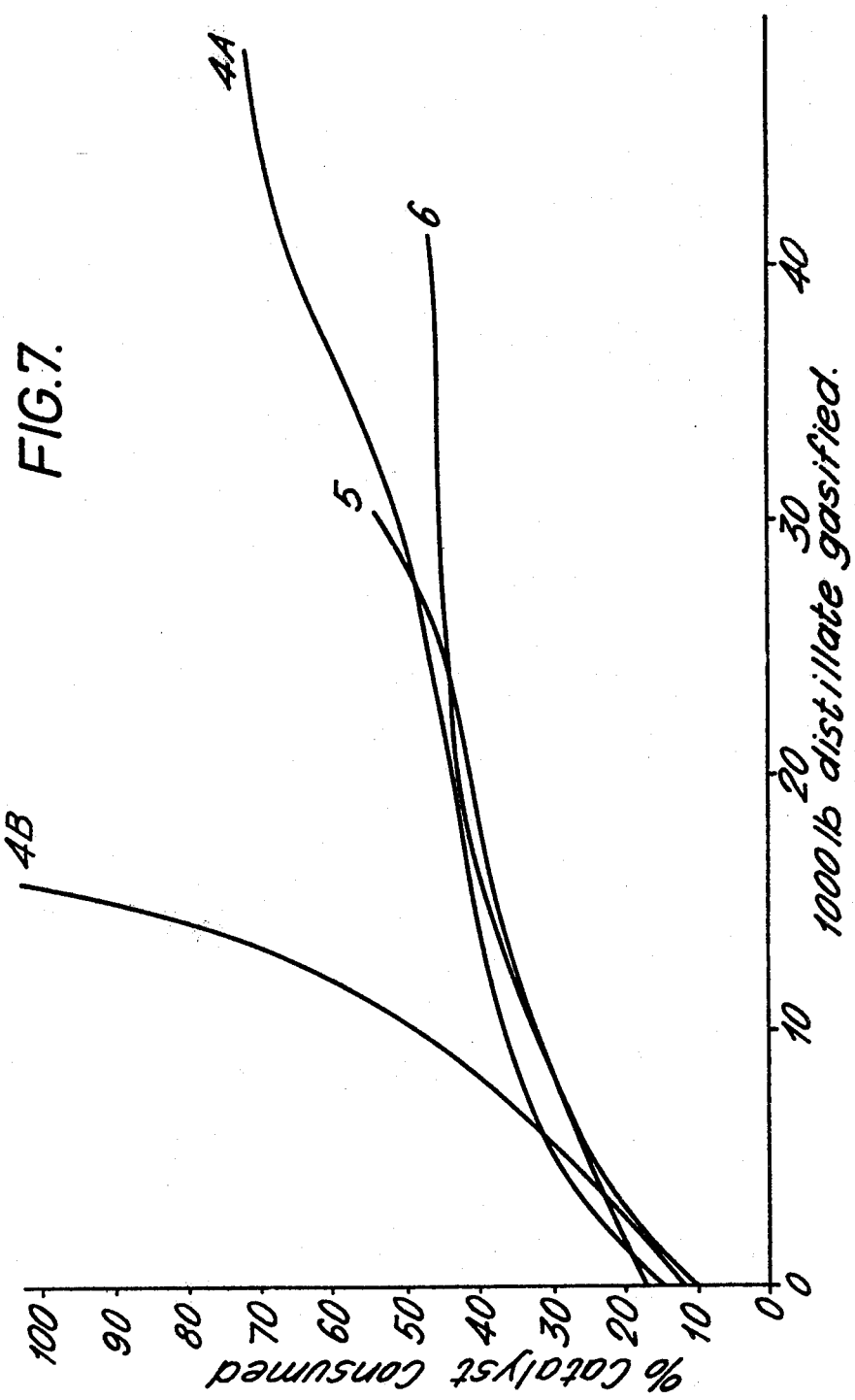
FIG. 7 is a graph plotting catalyst consumption against amount of distillate processed for various catalysts.

Both catalysts were then tested to compare performance. The performance test was carried out by loading the catalyst into a reaction vessel and passing a mixture of hydrocarbon and steam in a steam to hydrocarbon ratio of 2:1 using LDF 170 Naphtha. The reaction was effected at 650 psig and the reactants were preheated to 450° C. at the inlet of the reactor. The performance characteristics are shown in FIG. 7 of the drawings which is a plot of the % amount of catalyst consumed against feedstock gasified. The curves for the catalyst of this example are designated 4A and 4B. It will be apparent from FIG. 7 that catalyst 4A has performance characteristics far superior to 4B in so far as that at the termination of the experiment feedstock break-through had not occurred. Examination of both catalysts after shut down showed that catalyst 4B had become deactivated due to mass sintering.

EXAMPLE 5

The following amounts of chemicals were used:
Nickel Nitrate, hydrate 31.8 Kg
Aluminium Nitrate, hydrate 15.8 Kg
Sodium Carbonate, anhydrous 24.4 Kg
The nitrates were dissolved in 80 liters of water and the carbonate in 64 liters (deionised water was used throughout this Example).

The Preparation (Wet Stage)

The preparation was performed at constant temperature. The carbonate solution was heated to boiling and the nitrate solution to 92°-93° then the carbonate was slowly run into the nitrate solution with vigorous stirring over a period of 35 minutes. The temperature of the nitrate solution was monitored by a thermocouple—digital readent unit and the steam supply to the steam jacket of the preparation vessel was adjusted to keep the temperature in the range 92°-93°. At the end of the precipitation the slurry was held for a few minutes then heated to boiling and boiled gently for 30 minutes.

After boiling the slurry was passed to the rotary vacuum filter where it was filtered and washed on the filter using the spray bars. The cake was dripped into hot water and the resultant slurry made up to 180 liters and heated to 90° before the second filtration. The preparation was given six filtrations—an initial filtration and five wash filtrations on the final filtration ammonium carbonate (200 ppm) was added to the wash water and the spray bars were turned off to produce a dryer cake and the resulting cake was dropped into a steel tray from where it was loaded into plastic bags for storage.

Working up of Catalyst

The preparation produced 44.6 Kg of wet cake having a loss on drying of 70.6% and an overall loss on drying and calcination of 78.0%. The wet cake was placed in a fan over and dried overnight at 125°.

The dried catalyst was calcined at 450° for 2 hours and was then crushed to pass a 16 mesh sieve. It was blended with 2% graphite.

The final batch had the following composition and physical properties:
Nickel content, % 56.6
Sodium content, % undetected
Potassium content, % undetected
Crush strength, Kg 8.8
Bulk Density 0.97 gm/ml The catalyst was tested for performance under the conditions described in Example 4 and the performance characteristics shown in curve 5 in FIG. 7. The temperature of the gas leaving the reactor was 515° C. Analysis of the product gas showed that full equilibrium had been reached over the catalyst for that outlet temperature.

EXAMPLE 6

A catalyst precursor was prepared from nickel nitrate (31.8 Kg), aluminium nitrate (15.8 Kg) dissolved in 80 liters of water and sodium carbonate (24.4 Kg dissolved in 64 liters by the method described in the previous Example. The specific process conditions are summarised in the following Table.

TABLE 4

| | |
|---|---|
| Precipitation Temperature (start) | 92° |
| Precipitation Temperature (finish) | 93° |
| Time of Precipitation | 75 min |
| Time from end of precipitation to start of heating | 5 min |
| Temperature before heating | 93° |
| Time of heating | 7 min |
| Boiling point | 104° |
| Boiled for | 30 min |
| Number of washed | 5 |
| Temperature of reslurry | 90° |
| Temperature of water spray | 90° |
| Drying Temperature (fan oven) | 125° |
| Calcination Temperature | 450° |
| Calcination Time | 2 hours |
| Pellet Size | $\frac{1}{8} \times \frac{1}{8}$ inch |

Prior to the final filtration step 100 ppm sodium nitrate was added to the wash water as a filtering aid.

After the final filtration, 22.4 Kg of the wet filter cake were blended with 10.58 gm of anhydrous sodium carbonate dissolved in 2 liters of water. The blend was then dried, calcined and pelleted as summarised in the Table.

The final catalyst had the following chemical and physical properties:

| | | | |
|---|---|---|---|
| Nickel | 59.7% | Sulphur | 0.02% |
| Sodium | 0.01 | Crushing Strength | 7.1 Kg |
| Potassium | not detected | Bulk Density | 1.03 |

The catalyst was then subjected to a gasification step as described in Examples 4 and 5. The performance characteristics are shown in curve 6 of FIG. 7.

The outlet gas from the reactor had the following composition:

| | Wet (vol. %) | Dry, $CO_2$ Scrubbed (vol. %) |
|---|---|---|
| $CO_2$ | 12.2 | 1.0 |
| CO | 0.5 | 1.15 |
| $H_2$ | 7.4 | 17.6 |
| $CH_4$ | 33.2 | 80.25 |
| $H_2O$ | 46.7 | |

The exit temperature of the gas was 517° C.%.

We claim:

1. A catalyst precursor which when reduced will produce a catalyst which is resistant to deactivation by polymer formation or by sintering and is therefore advantageously suitable for reforming hydrocarbons with steam at high pressures to produce methane-containing gases, said catalyst precursor consisting essentially of a calcined mixture of nickel, alumina, sodium and potassium, said catalyst precursor having been formed by co-precipitation from water solution utilizing sodium or potassium precipitants in the essential absence of chemical species having a deleterious effect upon the performance of the catalyst, wherein the nickel content in the catalyst precursor ranges from 50 to 65% by weight of the total weight of the catalyst precursor and wherein (1) the total combined weight of sodium and potassium does not exceed 0.011 gm atoms/100 gm of catalyst precursor, (2) at combined sodium and potassium contents of up to 0.05% by weight of the catalyst precursor, the water loss is not more than 11.2, and (3) the ratio of sodium to potassium, expressed as a gram atom percentage, is $$\frac{30 - 10Na}{70 - 90 K}.$$

2. A catalyst precursor as claimed in claim 1, wherein the weight ratio of nickel to alumina ranges from 2.8 to 3.2 Ni:1Al$_2$O$_3$.

3. A catalyst precursor as claimed in claim 1, wherein the alkali metal concentration ranges from 0.2 to 0.3% K and less than 0.01% Na.

4. A catalyst precursor as claimed in claim 1, containing less than 0.01% K and less than 0.01% Na.

5. A catalyst precursor as claimed in claim 4, wherein the water loss value ranges from 11.2 to 9.

* * * * *